United States Patent [19]

Romano

[11] Patent Number: 4,824,420
[45] Date of Patent: Apr. 25, 1989

[54] REAR DERAILER FOR BICYCLE GEARS

[75] Inventor: Antonio Romano, Padua, Italy

[73] Assignee: Campagnolo S.p.A., Vicenza, Italy

[21] Appl. No.: 160,947

[22] Filed: Feb. 26, 1988

[30] Foreign Application Priority Data

Apr. 29, 1987 [IT] Italy .................................. 67366 A/87

[51] Int. Cl.⁴ ............................................. F16H 11/08
[52] U.S. Cl. .......................................... 474/78; 474/80
[58] Field of Search ....................................... 474/78-82

[56] References Cited

U.S. PATENT DOCUMENTS 4,384,864  5/1983  Bonnard .......................... 474/80 X

*Primary Examiner*—Thuy M. Bui
*Attorney, Agent, or Firm*—Sughrue, Mion, Zinn, Macpeak & Seas

[57] ABSTRACT

In a rear derailer for bicycle gears, of the type including a support member intended to be fixed to the bicycle frame and a chain transmission member connected to the support member and movable relative thereto, the transmission member is mounted for rectilinear sliding on a guide pin carried by the support member.

5 Claims, 1 Drawing Sheet

REAR DERAILER FOR BICYCLE GEARS

DESCRIPTION

The present invention relates to rear derailers for bicycle gears, of the type including a support member intended to be fixed to the bicycle frame, a chain transmission member connected to the support member and movable relative thereto, and means for causing movement of the transmission member.

According to a conventional technique, the transmission member, which carries one or more chain transmission wheels, is connected to the support member by means of an articulated parallelogram device which enables movement of the transmission member along an approximately rectilinear path inclined to the horizontal by an angle equal to half the opening angle of the imaginary cone circumscribed by the set of sprockets carried by the rear wheel of the bicycle. In this way, when the transmission is moved in order to cause derailment of the chain from one sprocket to another, the transmission wheels are always kept at the same distance from the sprockets, whichever sprocket is engaged with the chain.

The object of the present invention is to provide a rear derailer for bicycle gears which satisfies the above conditions (constant spacing of the transmission wheels from the sprockets) but has a more reliable structure which functions more precisely than solutions suggested hitherto.

In order to achieve this object, the subject of the invention is a rear derailer of the type indicated at the beginning of the present description, characterised in that the transmission member is mounted for rectilinear sliding on guide means carried by the support member.

This support member is articulated to a part for attachment to the bicycle frame, so as to enable the guide means to be oriented relative to the bicycle frame. More precisely, it is possible to orient the guide means so that the path of sliding of the transmission member is disposed at an angle of inclination to the horizontal which is equal to half the opening angle of the cone circumscribed by the sprockets carried by the rear wheel of the bicycle. If the set of sprockets is changed, it is thus possible to re-adjust the device to the new dimensions of the sprockets, so as to ensure that the gear change always operates correctly.

In a preferred embodiment, the guide means are constituted by a cylindrical guide pin which is carried by the support member and on which an appendage of the transmission member, connected to the latter in an orientable manner, is slidably mounted. In fact, when the orientation of the support member is altered after changing of the sprockets, it is also necessary to provide for orientation of the transmission member relative to the appendage so as to ensure that the wheels of the transmission member are kept with their axes parallel to the axis of the rear wheel.

Further characteristics and advantages of the present invention will become clear from the description which follows with reference to the appended drawings, provided purely by way of non-limiting example, in which.

Figure 1:
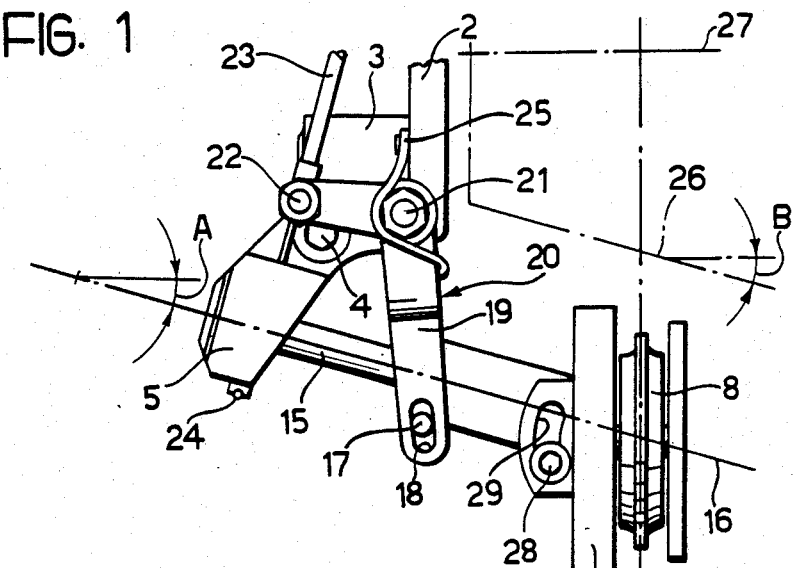
FIG. 1 is a front view of a derailer according to the invention.

In the drawings, the sprockets carried by the hub of the rear wheel of the bicycle are illustrated schematically and indicated 1, while a part of the bicycle frame situated adjacent the sprockets 1 is indicated 2. An attachment part 3 is fixed to the part 2 of the frame by fixing means of any known type (not illustrated), for example by means of screws, and a member 5 for supporting the rear derailer 6 of the bicycle is connected thereto for articulation about an axis 4. The derailer 6 includes a transmission member 7 provided with wheels 8 for transmission of the bicycle chain. In the embodiment illustrated, the transmission member 7 includes two rings 9 defining a spherical seat 10 in which is housed a ball-shaped end 11 of a tubular element 12 constituting an appendage of the transmission member. At its end opposite the spherical end 11, the tubular element 12 has a cylindrical portion 13 of increased diameter which is slidably mounted by means of the interposition of a bush 14 on a cylindrical guide pin 15, whose axis is indicated 16, carried by the support member 5. The bush may also be constituted by a ball guide bush.

The cylindrical portion 13 is provided with a transverse pin 17 whose ends project from the portion 13 and engage respectively in two slots 18 (FIG. 1) formed in the two arms 19 of a fork-shaped end of a cranked lever 20. The cranked lever 20 is supported at 21 for articulation on the attachment part 3 and its opposite end 22 is connected to the sheath 23 of a Bowden cable anchored at 24 to the support member 5, the cable being operated by the gear lever (not illustrated) of the bicycle. Operation of the cable causes corresponding rotation of the cranked lever 20 and consequent movement of the transmission member 7 along the line of the axis 16. A pin spring 25 associated with the lever 20 tends to bias this lever into its starting position when the gear change is no longer operated.

Figure 2:
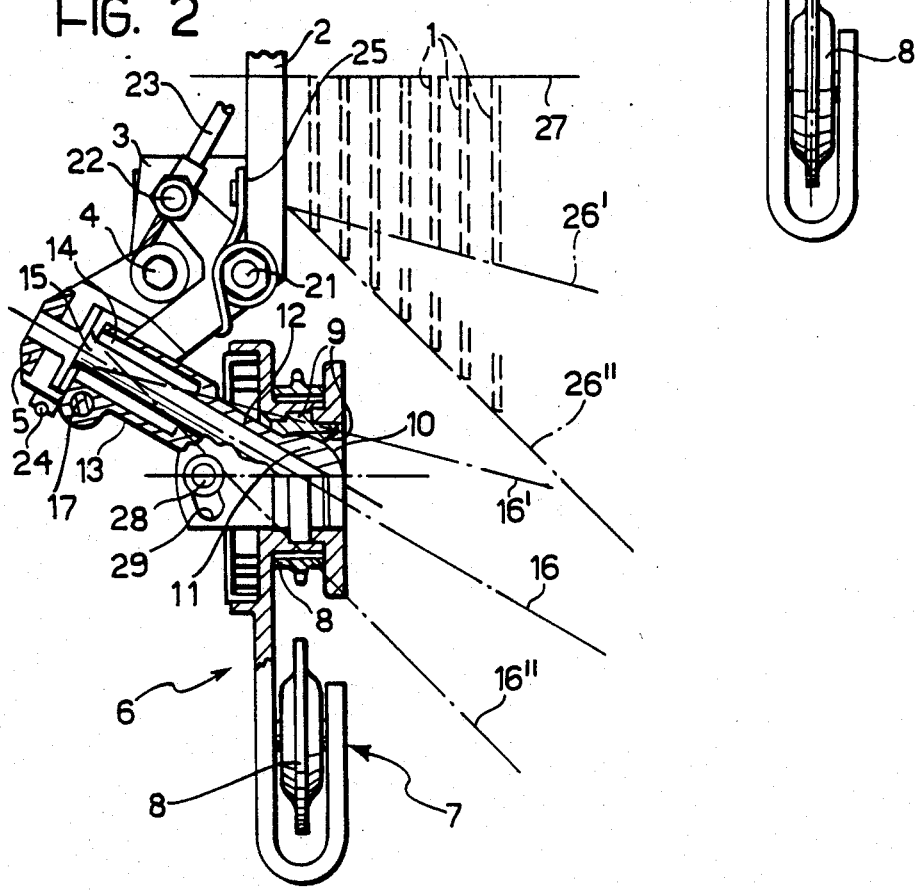
FIG. 2 is a partially sectional view of the derailer of FIG. 1.

As can be seen, the ability to rotate the support member 5 about the articulation axis 4 (the support may be clamped by tightening a screw provided at this articulation) enables the axis 16 to be oriented so as to keep its inclination A to the horizontal equal to half the opening angle B of the theoretical cone 26 circumscribed by the set of sprockets 1. When the set of sprockets is changed from that shown in FIG. 1, such that the theoretical cone 26 assumes the configurations indicated 26' and 26" in FIG. 2, it is possible to orient the axis 16 correspondingly so that it assumes the positions indicated 16' and 16" in FIG. 2. Naturally, when the support member 5 is rotated about the articulation axis 4, it is then necessary to rotate the transmission member 7 relative to the appendage 12, by means of the ball joint 11, in order to keep the axes of the transmission wheels parallel with the axis 27 of the sprockets.

The transmission member may then be clamped in the required position by means of a bolt 28 which engages in a curved slot 29 formed in the transmission member 7 which is thus made fast to the appendage 12.

Naturally, the principle of the invention remaining the same, the details of construction and forms of embodiment may be varied widely with respect to those described and illustrated purely by way of example, without thereby departing from the scope of the present invention. For example, the means for causing movement of the transmission member 7 could be operated electrically, hydraulically or pneumatically.

I claim:

1. A rear derailer for bicycle gears, comprising a support member intended to be fixed to a bicycle frame, a chain transmission member connected to the support member and movable relative thereto, means for causing movement of the transmission member which is mounted for rectilinear sliding on guide means carried by the support member, said guide means being comprised of a cylindrical guide pin with said transmission member having an appendage to which the transmission member is orientably connected and which is slidably mounted on the guide pin, and means for clamping the transmission member in the preselected position.

2. A derailer according to claim 1, wherein it includes a part for attachment to the bicycle frame and the support member is articulated to said part so as to enable the guide means to be oriented relative to the bicycle frame.

3. A derailer according to claim 1, wherein the appendage is constituted by a tubular element having one end slidably mounted on the cylindrical guide pin, a bush being interposed between said one end and the pin, and an opposite end which is ball-shaped, the transmission member defining a spherical seat in which the ball-shaped end is housed.

4. A derailer according to claim 1, wherein the means for causing movement of the transmission member comprises a lever mounted pivotably on said support member and having one end connected to the transmission member and cable means for operating the gear change being connected to the other end of the lever.

5. A derailer according to claim 1, wherein the means for causing movement of the transmission member are selected from electrically-operated means, pneumatically-operated means, and hydraulically-operated means.

* * * * *